United States Patent [19]
Fukumoto

[11] Patent Number: 5,580,095
[45] Date of Patent: Dec. 3, 1996

[54] VEHICLE BODY LEVELLING DEVICE FOR A WORKING VEHICLE HAVING OUTRIGGERS

[75] Inventor: Takefumi Fukumoto, Kawagoe, Japan

[73] Assignees: Kabushiki Kaisha Komatsu Seisakusho; Komatsu Mec Kabushiki Kaisha, both of Tokyo, Japan

[21] Appl. No.: 387,896

[22] PCT Filed: Jun. 20, 1994

[86] PCT No.: PCT/JP94/00984

§ 371 Date: Feb. 21, 1995

§ 102(e) Date: Feb. 21, 1995

[87] PCT Pub. No.: WO95/00372

PCT Pub. Date: Jan. 5, 1995

[30] Foreign Application Priority Data

Jun. 28, 1993 [JP] Japan ................................ 5-178516
Sep. 22, 1993 [JP] Japan ................................ 5-257448

[51] Int. Cl.⁶ ................................................ B60S 9/00
[52] U.S. Cl. ................ 280/840; 280/6.12; 280/DIG. 1; 280/766.1
[58] Field of Search ................ 280/840, 6.1, 6.11, 280/6.12, 764.1, 765.1, 766.1, DIG. 1; 180/41

[56] References Cited

U.S. PATENT DOCUMENTS

| 4,913,458 | 4/1990 | Hamilton | 280/6.1 |
|---|---|---|---|
| 4,991,673 | 2/1991 | Ericsson | 280/840 |
| 5,117,595 | 6/1992 | Brendel | 280/840 |
| 5,143,386 | 9/1992 | Uriarte | 280/6.1 |
| 5,159,989 | 11/1992 | Claxton | 280/6.1 |
| 5,312,119 | 5/1994 | Schneider et al. | 280/840 |

FOREIGN PATENT DOCUMENTS 61-52712  11/1986  Japan.
2-30906   7/1990   Japan.
3-22961   3/1991   Japan.
3-132452  6/1991   Japan.
3-121067  12/1991  Japan.

*Primary Examiner*—Kenneth R. Rice
*Attorney, Agent, or Firm*—Flynn, Thiel, Boutell & Tanis, P.C.

[57] ABSTRACT

A vehicle body levelling device for a working vehicle having outriggers 5 provided at the front and rear of a self-propelled lower running body 1 for stabilizing the vehicle body while in service wherein the inclinations of the vehicle body in the front to rear and left to right directions thereof are detected by means of a front to rear inclination detector 13 and a left to right inclination detector 14, respectively, and the lengths of the front, rear, left and right outrigger arms 6 are detected by outrigger length detectors 18 so as to calculate by a controller 10 required amount of extension of piston rods of the left and right jack cylinders 7 provided on the front and rear outriggers 5, and wherein a control valve 15 provided on each of the jack cylinders is controlled in accordance with results of the calculation, whereby the vehicle body can be levelled in a short period of time even on an inclined place. The vehicle body levelling device further comprises a two-axis inclination detector 115 for detecting the inclinations in the front to rear and left to right directions of the vehicle body and hydraulic pressure detectors 117 provided on the respective jack cylinders 7, whereby extension/contraction amounts of the piston rods of the respective jack cylinders 7 are calculated by a controller 120 in accordance with the inclinations of the vehicle body detected by the two axis inclination detector 115 and an individual outrigger valve 111 provided on each of the jack cylinders 7 is controlled such that the hydraulic pressure of each of the jack cylinders 7 becomes a predetermined value, thereby making it possible to level the vehicle body in a short period of time only by operating an automatic levelling switch 121.

3 Claims, 13 Drawing Sheets

FIG. 13
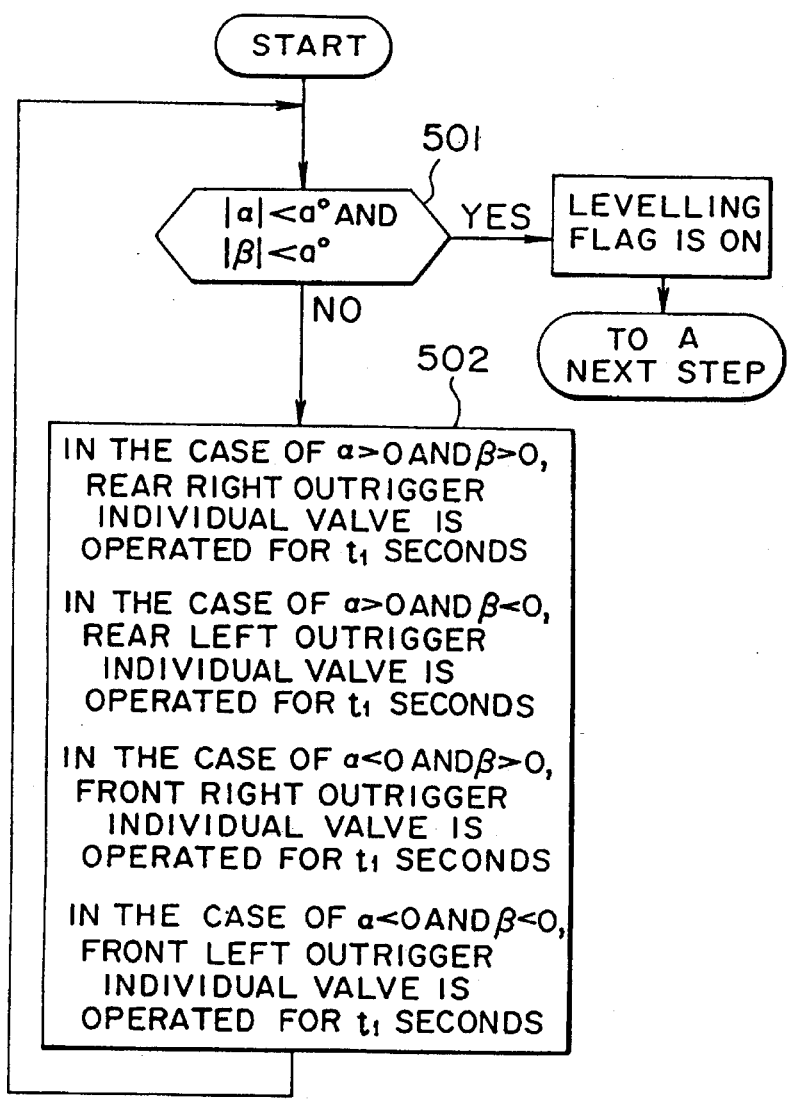
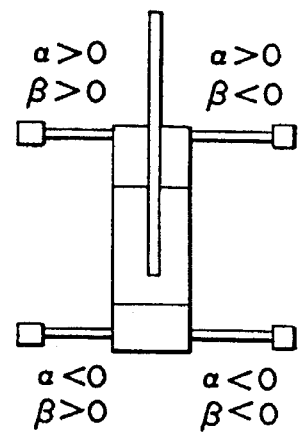

VEHICLE BODY LEVELLING DEVICE FOR A WORKING VEHICLE HAVING OUTRIGGERS

TECHNICAL FIELD

The present invention relates to a vehicle body levelling device for a working vehicle having outriggers.

BACKGROUND TECHNOLOGY

In a working vehicle having outriggers for stabilizing a vehicle body of a working vehicle such as a crane, it is necessary to maintain to level the vehicle body even on an inclined ground.

Accordingly, there is proposed a device for automatically levelling the vehicle body even on the inclined ground as disclosed in Japanese Patent Publication No. 2-30906.

However, when the vehicle body is levelled by the aforementioned conventional vehicle body levelling device for a working vehicle, it is necessary firstly to extend each hydraulic jack unit to its maximum, then, to contract each hydraulic jack unit so as to level the vehicle body in response to a signal issued by an inclination detector means, which causes such inconvenience that a working efficiency is lowered since it takes time from the start of operation to the completion of levelling of the vehicle body.

Further, since the conventional device starts the levelling control from the state where the hydraulic jack unit is in its maximum stroke to thereby lift the vehicle body to the maximum height, in ordinary case, the levelling control is frequently completed at the state where the vehicle body is lifted to its maximum.

As a result, the position of the center of gravity of the vehicle body becomes high, which makes the device unstable during the operation thereof.

The invention is made to improve such a drawback and to provide a vehicle body levelling device for a working vehicle having outriggers which is capable of levelling the vehicle body in a short period of time, and particularly to provide a vehicle body levelling device for a working vehicle having outriggers which is capable of levelling the vehicle body in a position where the center of gravity of the vehicle body is low.

DISCLOSURE OF THE INVENTION

To achieve the above objects, in a vehicle body levelling device for a working vehicle having outriggers provided at the front and rear of a self-propelled lower running body according to a first aspect of the invention, wherein the outriggers comprises outrigger arms which can be extended and contracted in the left and right directions thereof for stabilizing the vehicle body while in service, and jack cylinders provided at distal ends of the outrigger arms for vertically supporting the vehicle body, the vehicle body levelling device comprises a front to rear inclination detector for detecting an inclination of the vehicle body in the front to rear directions thereof, a left to right inclination detector for detecting an inclination of the vehicle body in the left to right directions thereof, outrigger length detectors for detecting lengths of the outrigger arms, and a controller for calculating whether the vehicle body is inclined in the front to rear or left to right directions thereof, calculating extension/contraction amounts of piston rods, which are necessary for levelling the vehicle body, of the jack cylinders provided on each outrigger arm, and controlling control valves provided on the jack cylinders in accordance with results of calculation.

With such an arrangement, it is possible to level the vehicle body in a short period of time even when the working vehicle operates on an inclined ground.

The vehicle body levelling device for a working vehicle having outriggers according to a second aspect of the invention further comprises a two-axis inclination detector for detecting inclinations of the vehicle body in the front to rear and left to right directions thereof, hydraulic pressure detectors provided on the jack cylinders for detecting hydraulic pressures in the jack cylinders, and a controller for calculating extension/contraction amounts of piston rods of the jack cylinders in accordance with inclinations of the vehicle body detected by the two axis inclination detector and for controlling individual outrigger valves provided on the jack cylinders such that hydraulic pressures of the jack cylinders become a predetermined value. The vehicle body can be levelled in a short period of time by merely operating an automatic levelling switch.

With such an arrangement, it is possible to level the vehicle body in a short period of time by merely operating an automatic levelling switch in the case of operating the vehicle body while the working vehicle stops on the inclined ground. Also, it is possible to improve stability of the vehicle body during the operation thereof since the vehicle body is levelled in a position where the center of gravity is low.

BRIEF DESCRIPTION OF THE DRAWINGS

FIGS. 11, 12 and 13 are flow charts showing operations of the vehicle body levelling device.

BEST MODE FOR CARRYING OUT THE INVENTION

An embodiment of the invention will be now described in detail with reference to FIGS. 1 to 5.

Figure 1:
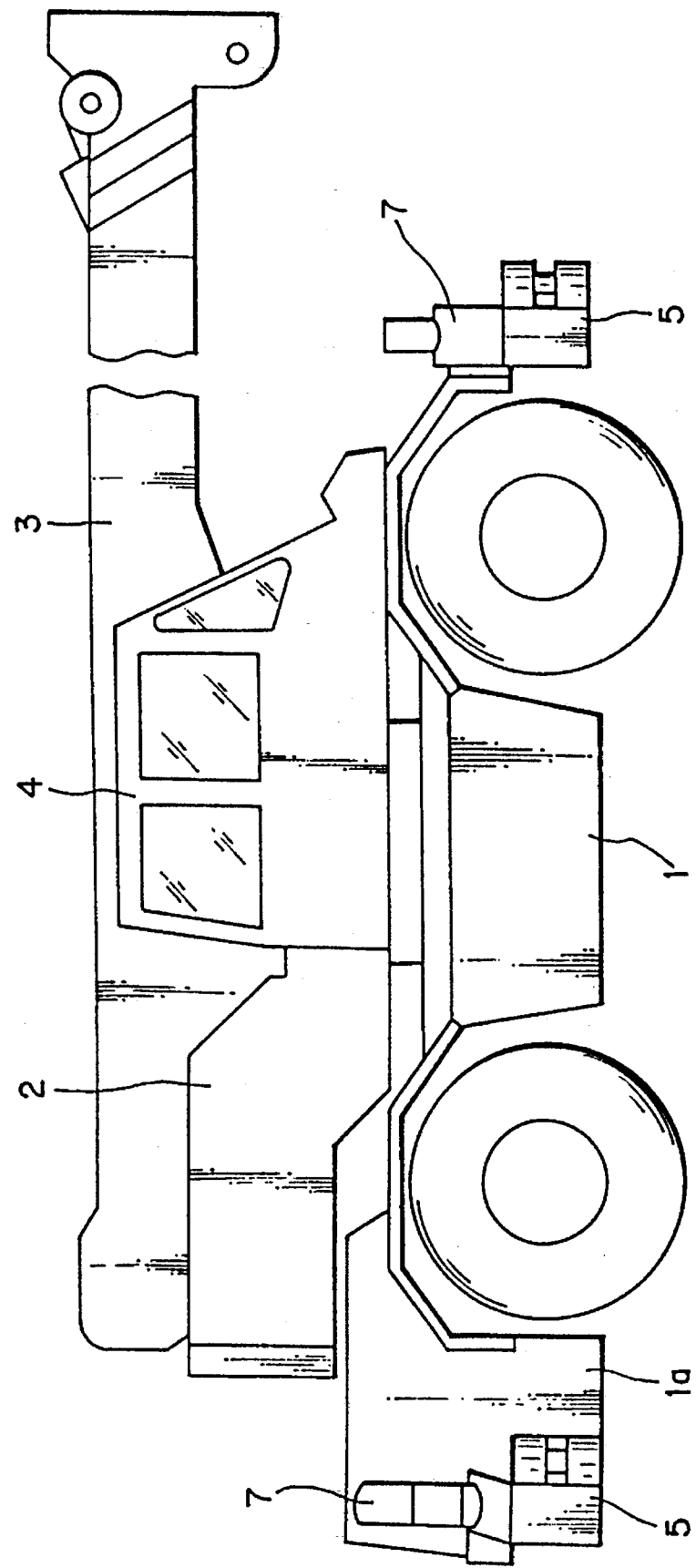
FIG. 1 is a side view of a working vehicle having outriggers according to an embodiment of the invention.
Figure 2:
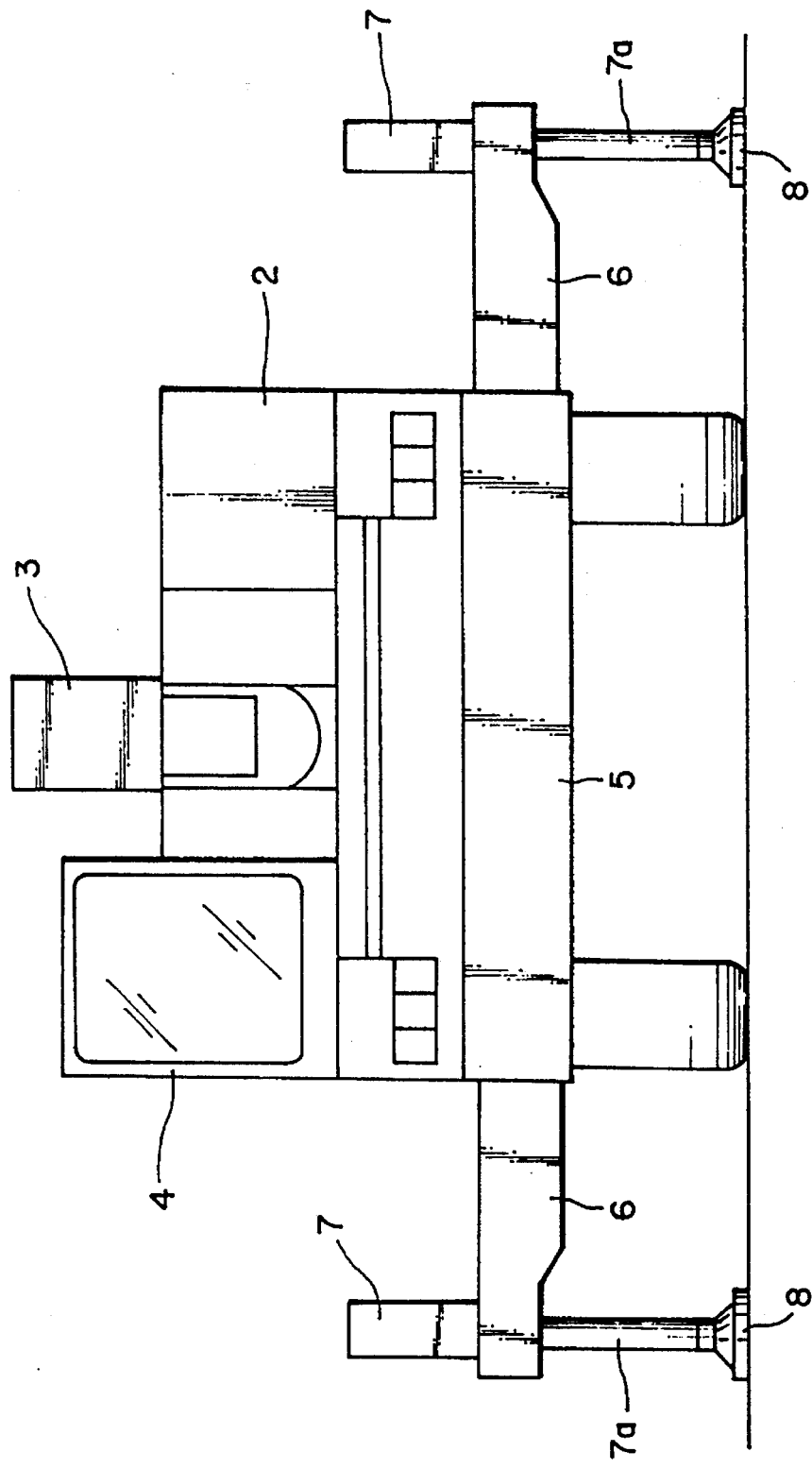
FIG. 2 is a front view of the working vehicle of FIG. 1.

FIG. 1 shows a working vehicle having outriggers which includes a self-propelled lower running body 1, a freely turnable upper turning body 2 provided on the lower running body 1, a crane boom 3 and an operator's room 4 which are disposed on the upper turning body 2.

Figure 3:
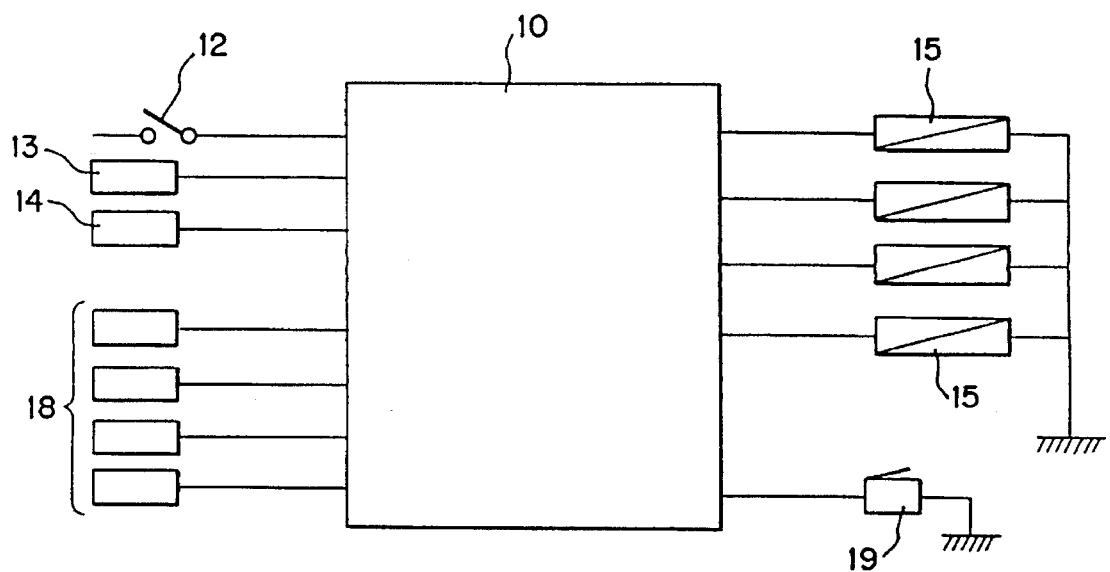
FIG. 3 is a block diagram of a vehicle body levelling device for the working vehicle of FIG. 1.

Outrigger 5 are provided on a vehicle body 1a of the lower running body 1 at the front and rear thereof for stabilizing the vehicle body 1a. The outriggers 5 have outrigger arms 6 which can be extended and contracted sidewardly from the vehicle body 1a. Jack cylinders 7 each having a piston rod 7a projecting downward therefrom are vertically fixed to tip ends of the outrigger arms 6. Floats 8 are swingably attached to tip ends of the piston rods 7a (also refer to FIG. 2). The jack cylinders 7 are controlled by a control unit as shown in FIG. 3 so that the piston rods 7a can be extended or contracted.

The control unit comprises a controller 10 composed of a microcomputer. There are provided an automatic levelling switch 12, a front to rear inclination detector 13 for detecting the inclination of the vehicle body 1a in the front to rear directions thereof, a left to right inclination detector 14 for detecting the inclination of the vehicle body 1a in the left to right directions thereof, and outrigger length detectors 18 for detecting the lengths of the outrigger arms 6 provided at the front, rear, left and right of the vehicle body 1a, which are respectively arranged at an input side of the controller 10. There are provided control valves 15, which are respectively arranged at an output side of the controller 10, for controlling the pressure of oil supplied to each of the jack cylinders 7 of the outriggers 5. Each of the control valves 15 comprises a solenoid valve and it is connected to each of the jack cylinders 7.

Figure 4:
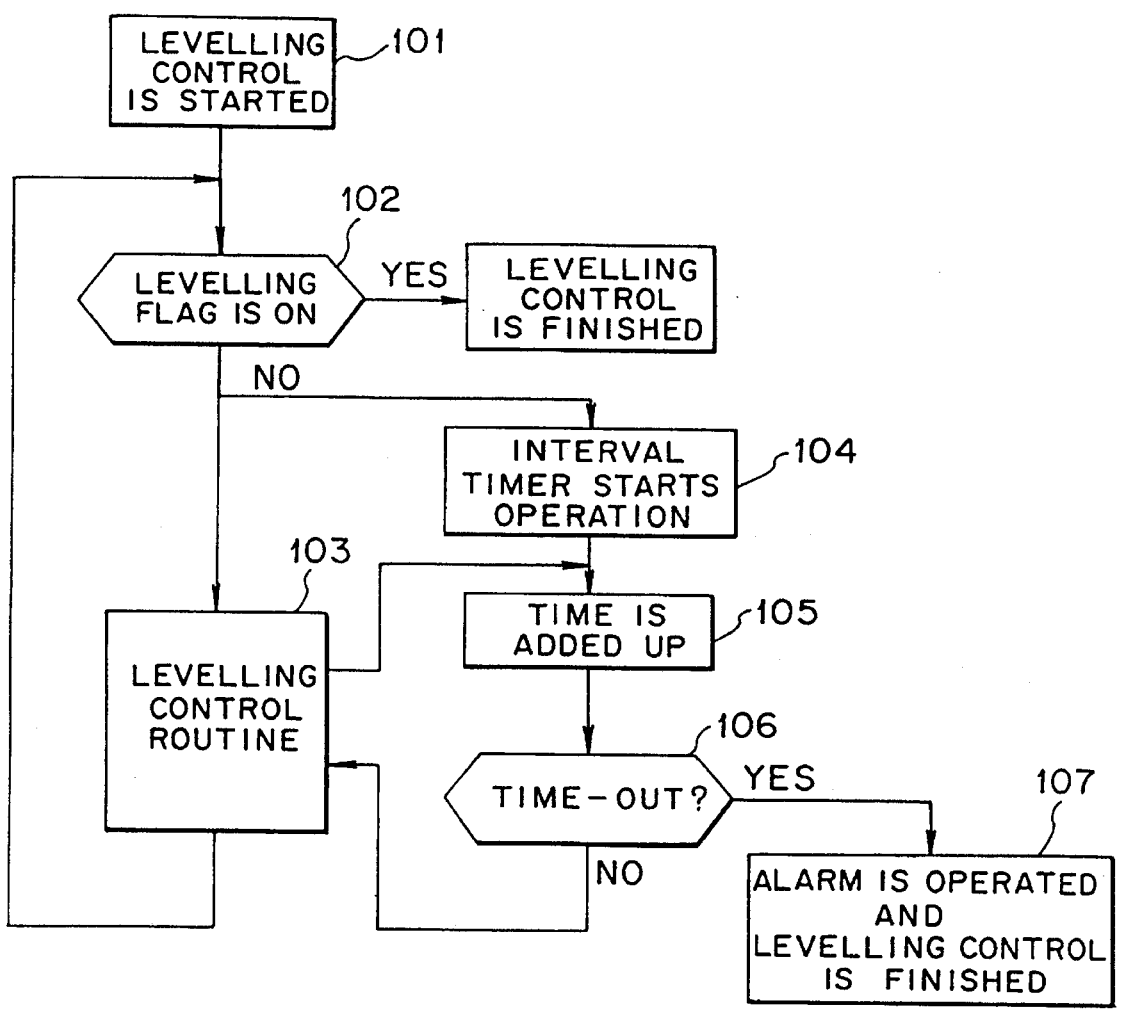
FIG. 4 is a flow chart showing an operation of the vehicle body levelling device for the working vehicle having outriggers of FIG. 3.

An operation of the vehicle body levelling device will be now described with reference to a flow chart showing a levelling control program in FIG. 4. When the crane boom 3 is operated while the working vehicle stops on an inclined ground, the outrigger arms 6 are extended as long as possible so as to more stabilize the vehicle body 1a. Successively, four jack cylinders 7 are extended at the same time to such an extent that tires float. In this state, the vehicle body 1a is inclined on the inclined ground.

Now, the automatic levelling switch 12 is turned on, whereby the program, i.e. levelling control program is started with a step 101.

The controller 10 checks whether a levelling flag is ON or not in a step 102. If the levelling flag is ON, the controller 10 judges that the working vehicle is levelled, whereby the vehicle body levelling control is finished.

If the controller 10 judges that the levelling flag is not ON in the step 102, the program goes to a step 103, wherein a levelling control routine is executed.

Figure 5:
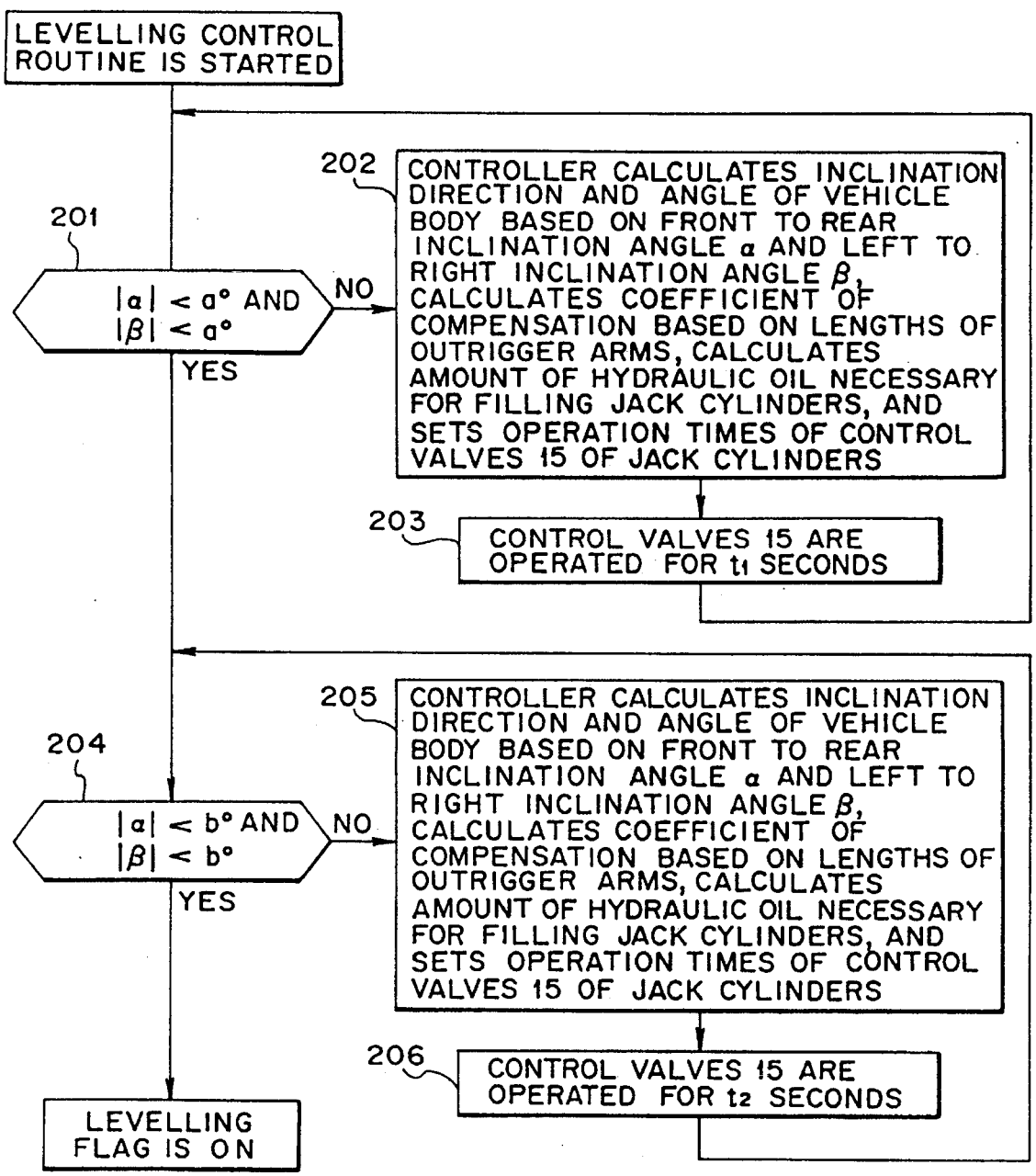
FIG. 5 is also a flow chart showing an operation of the vehicle body levelling device for the working vehicle of FIG. 3.

The levelling control routine is executed in accordance with a flow chart of FIG. 5. In a step 201, the controller 10 judges whether an inclination angle $\alpha$ of the vehicle body 1a in the front to rear directions thereof is less than, e. g, ao and also judges whether an inclination angle $\beta$ of the vehicle body 1a in the left to fight directions thereof is less than ao. If the controller 10 judges that the inclination angles $\alpha$ and $\beta$ are respectively greater than ao, it sets an operation time $t_1$ of each control valve 15, which is provided on each jack cylinder 7, in a step 202, and operates each control valve 15 for a period of $t_1$ seconds in a step 203.

When the controller 10 judges that the inclination angles $\alpha$ and $\beta$ are respectively less than ao, the program goes to a step 204, wherein the controller 10 judges whether the inclination angles $\alpha$ and $\beta$ are respectively less than bo. If the controller 10 judges that the inclination angles $\alpha$ and $\beta$ are greater than bo, the program goes to a step 205, wherein the controller 10 sets an operation time $t_2$ of each control valve 15, which is shorter than the operation time $t_1$, and operates each control valve 15 for a period of $t_2$ seconds in a step 206. When the inclination angles $\alpha$ and $\beta$ are respectively less than bo, namely, when the vehicle body 1a is levelled, the levelling flag is ON, whereby the levelling control is finished.

Whereupon, considering a case where the vehicle body 1a is not levelled even if the piston rods 7a of the jack cylinders 7 are fully extended when the inclination of the vehicle body is sharp, an interval timer starts operation in a step 104. The interval timer adds up time during the levelling control routine in a step 105 while the controller 10 checks whether the interval timer times out in a step 106. The controller 10 continues the levelling control routine in case the timer does not time out.

If the controller 10 judges that the timer counts the time-out in the step 106, the program goes to a step 107, wherein an alarm is operated. At the same time, the controller 10 stops the levelling control routine.

A vehicle body levelling device according to another embodiment of the invention will be now described with reference to FIGS. 6 and 7.

Figure 6:
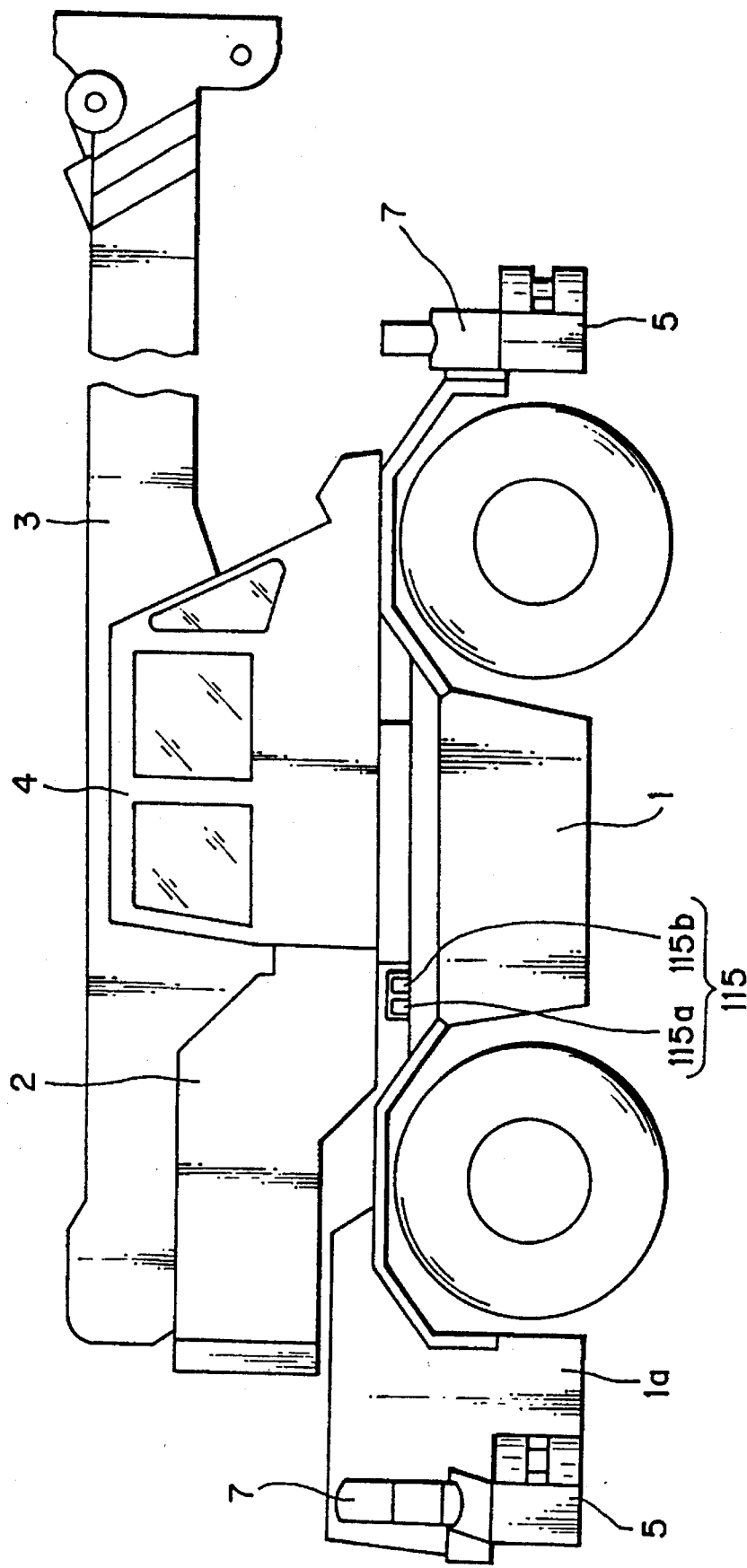
FIG. 6 is a side view of a working vehicle according to another embodiment of the invention.
Figure 7:
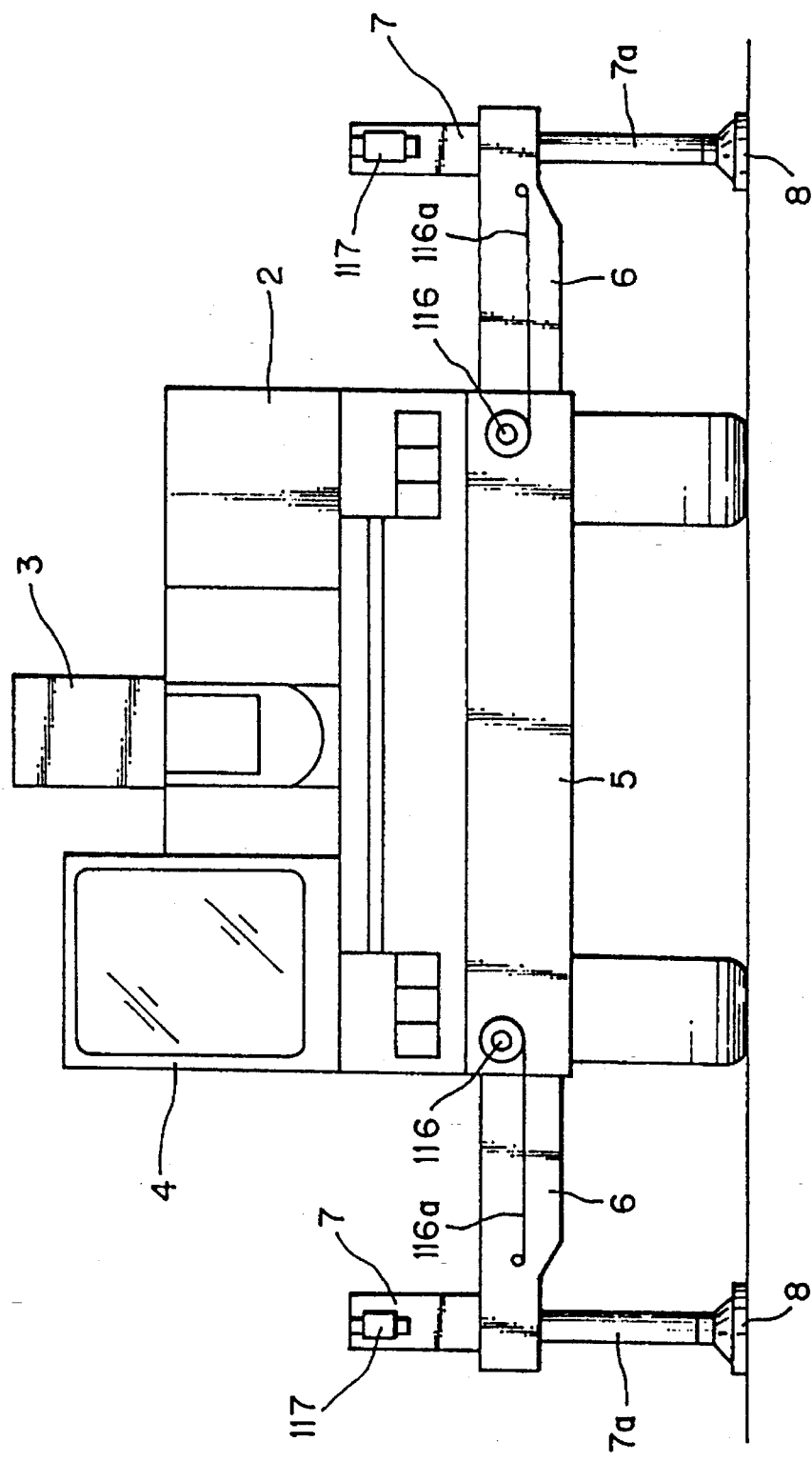
FIG. 7 is a front view of the working vehicle of FIG. 6.

FIG. 6 shows a working vehicle having outriggers which includes a self-propelled lower running body 1, a freely turnable upper turning body 2 provided on the lower running body 1, a crane boom 3 and an operator's room 4 which are disposed on the upper turning body 2, in the same way as FIG. 1.

Outrigger 5 are provided on a vehicle body 1a of the lower running body I at the front and rear thereof for stabilizing the vehicle body 1a. As shown in FIG. 7, the outriggers 5 have outrigger arms 6 which are extended and contracted sidewardly from the vehicle body 1a. Jack cylinders 7 each having a piston rod 7a projecting downward therefrom are vertically fixed to tip ends of the outrigger arms 6. Floats 8 are swingably attached to tip ends of the piston rods 7a.

The outriggers 5 are generally called as an H-type outrigger. The present invention can be also applied to an X-type outrigger having outrigger arms which are assembled in an X-shape.

Figure 8:
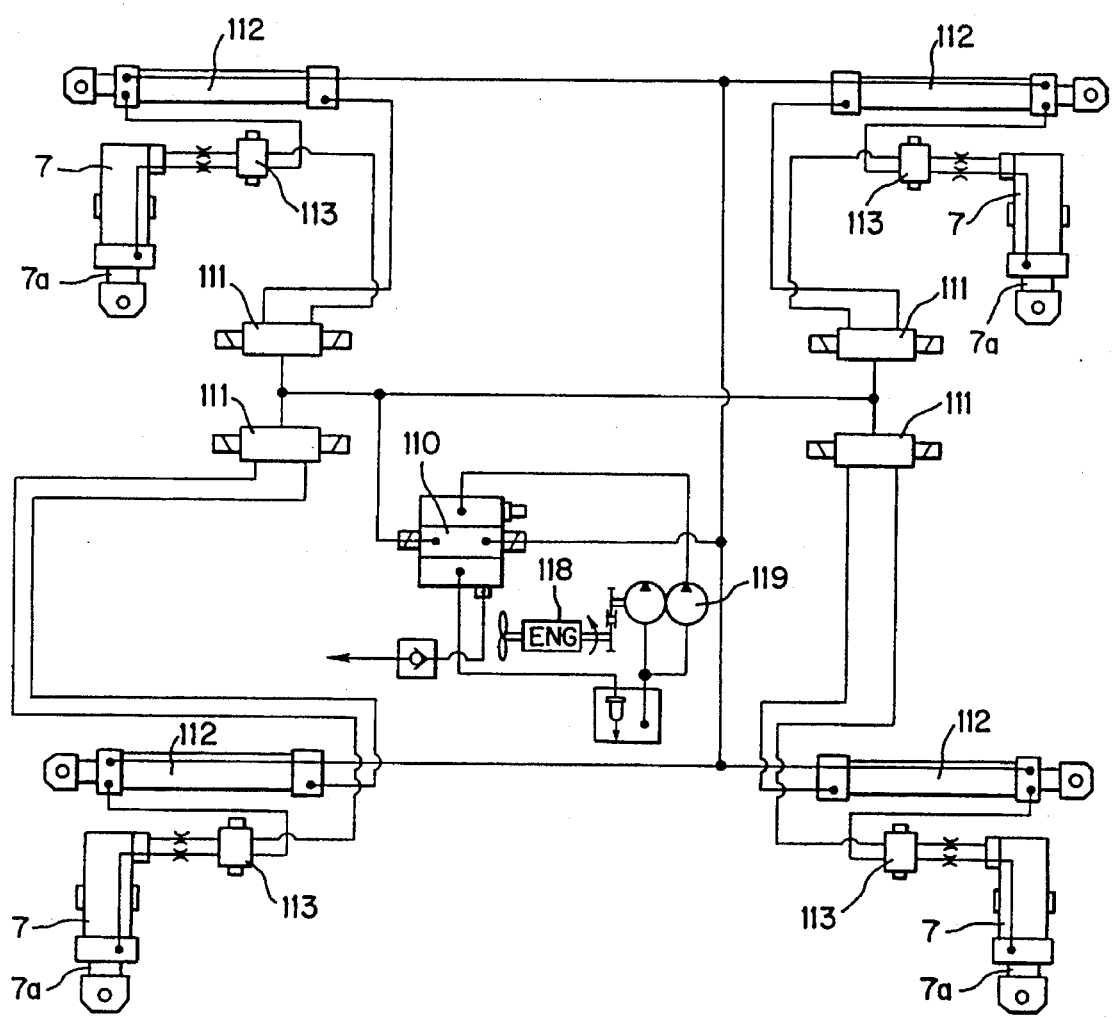
FIG. 8 is a circuit diagram showing a hydraulic circuit of outriggers of the working vehicle provided with a vehicle body levelling device for the working vehicle of FIG. 6.

FIG. 8 shows a hydraulic circuit of the outriggers 5. Hydraulic oil discharged by a hydraulic pump 119, when driven by an engine 118, is branched off in two directions by an outrigger selector valve 110 comprising a solenoid valve. One branched hydraulic oil is supplied to bottoms of arm slide cylinders 112 through individual outrigger valves 111, each of which comprises a solenoid valve and is provided on each of the jack cylinders 7, and also it is supplied to heads of the jack cylinders 7 through double check valves 113. The other branched hydraulic oil is supplied to heads of the arm slide cylinders 112.

Figure 9:
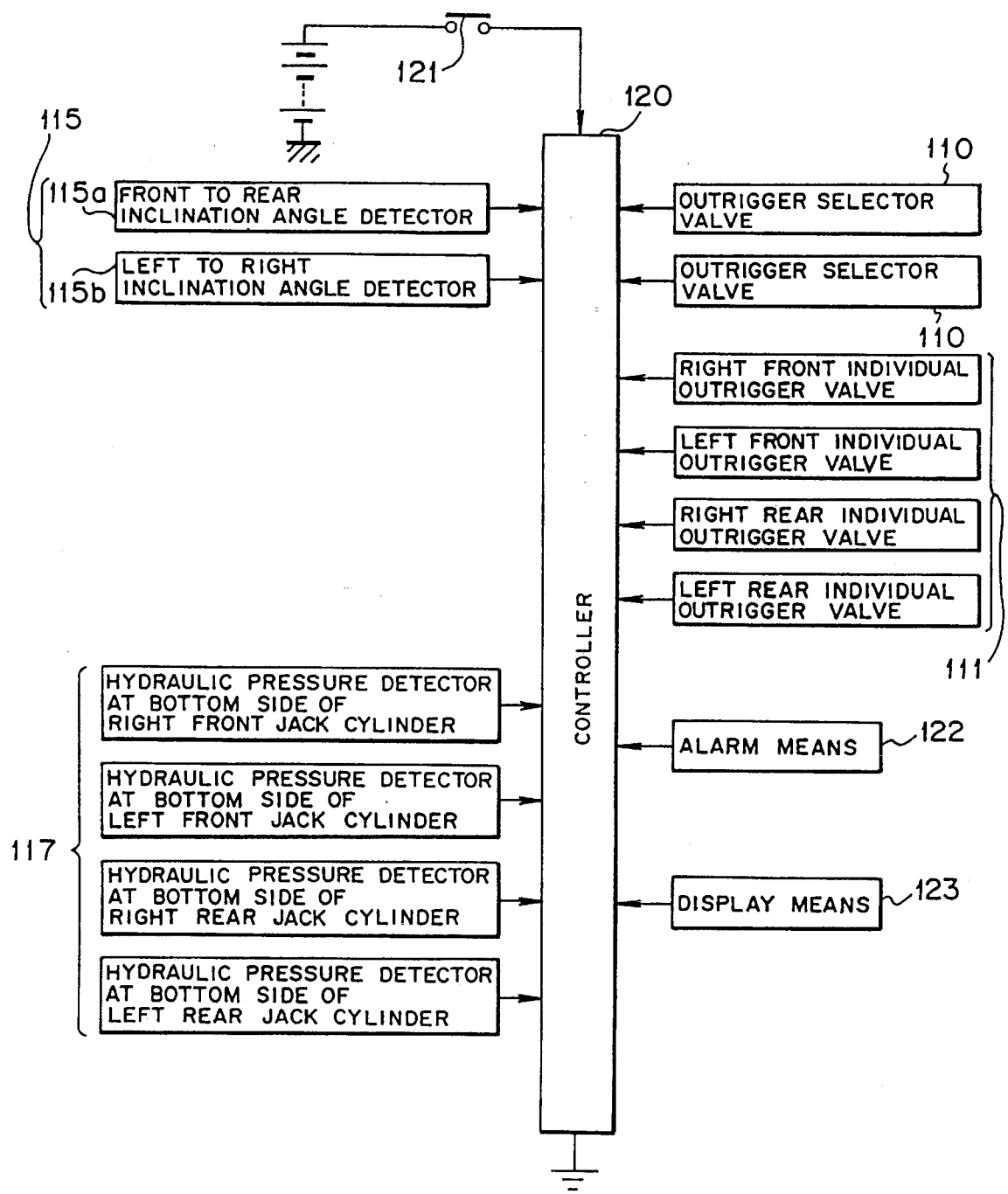
FIG. 9 is a block diagram showing a control system of the vehicle body levelling device.
Figure 10:
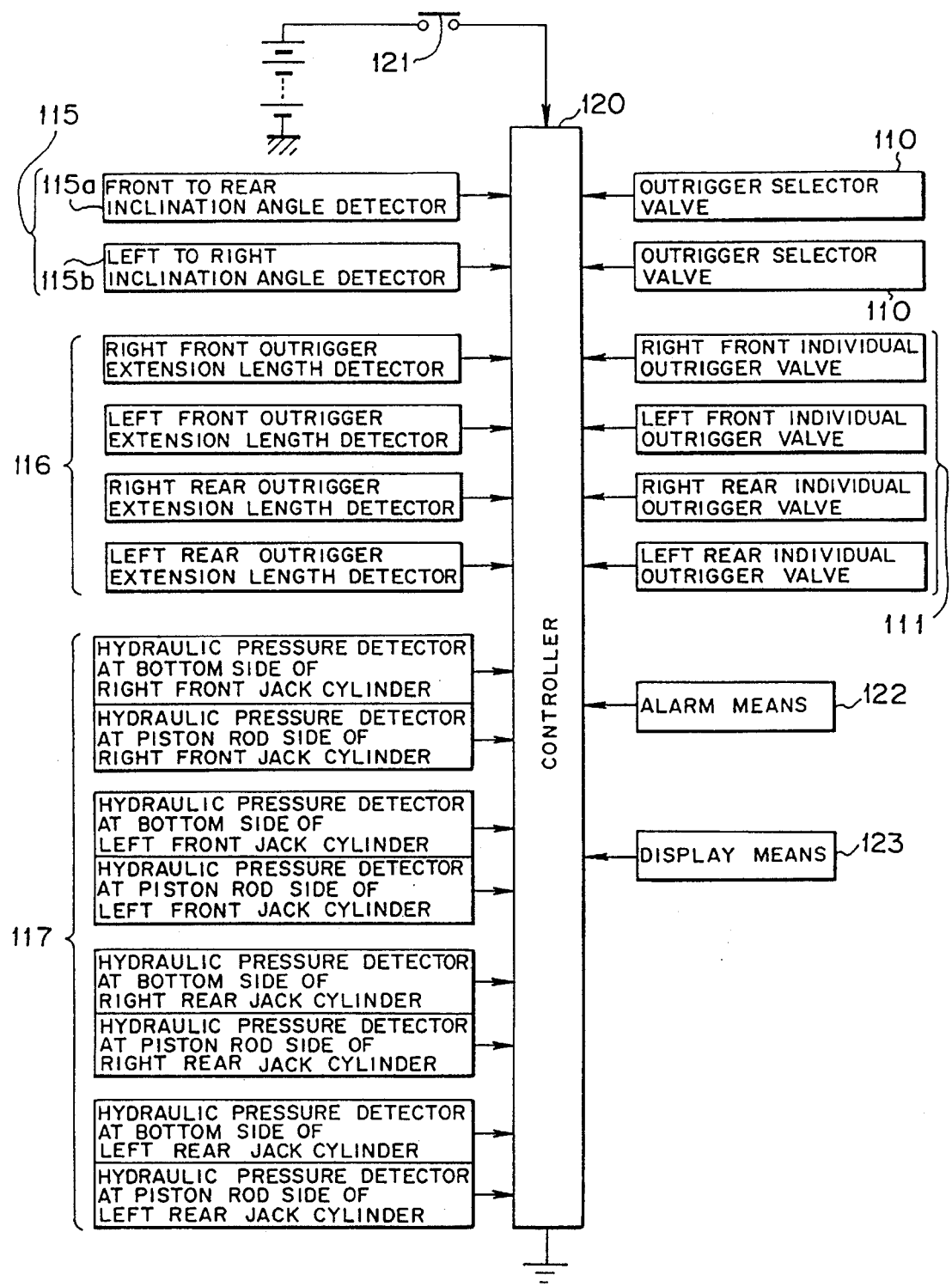
FIG. 10 is a block diagram showing a control system of a vehicle body levelling device according to still another embodiment of the invention.

As shown in FIG. 6, the vehicle body 1a has a two axial inclination detector 115 comprising a front to rear inclination detector 115a for detecting the inclination of the vehicle body 1a in the front and rear directions thereof and a left to fight inclination detector 115b for detecting the inclination of the vehicle body 1a in the left and right directions thereof. As shown in FIG. 7, the outriggers 5 have outrigger extension length detectors 116 for detecting the extension/contraction amounts of the outrigger arms 6 through wires 116a and the jack cylinders 7 have hydraulic pressure detectors 117 for detecting hydraulic pressures in bottom sides of the jack cylinders 7. Signals detected by these detectors 115, 116 and 117 are respectively input to a controller 120 as shown in FIG. 9 and FIG. 10. The outrigger selector valves 110 and individual outrigger valves 111 are controlled as follows in response to these signals.

In FIGS. 9 and 10, denoted at 121 is an automatic levelling switch, 122 is an alarm means for issuing a command from the controller 120, 123 is a display unit showing operating states of the outriggers 5.

An operation of the vehicle body levelling device using a control system in FIG. 9 will be now described with reference to the flow chart of FIG. 11. When the crane room 3 is operated while the working vehicle stops on the inclined ground, the outrigger arms 6 are extended as long as possible so as to stabilize the vehicle body.

Figure 11:
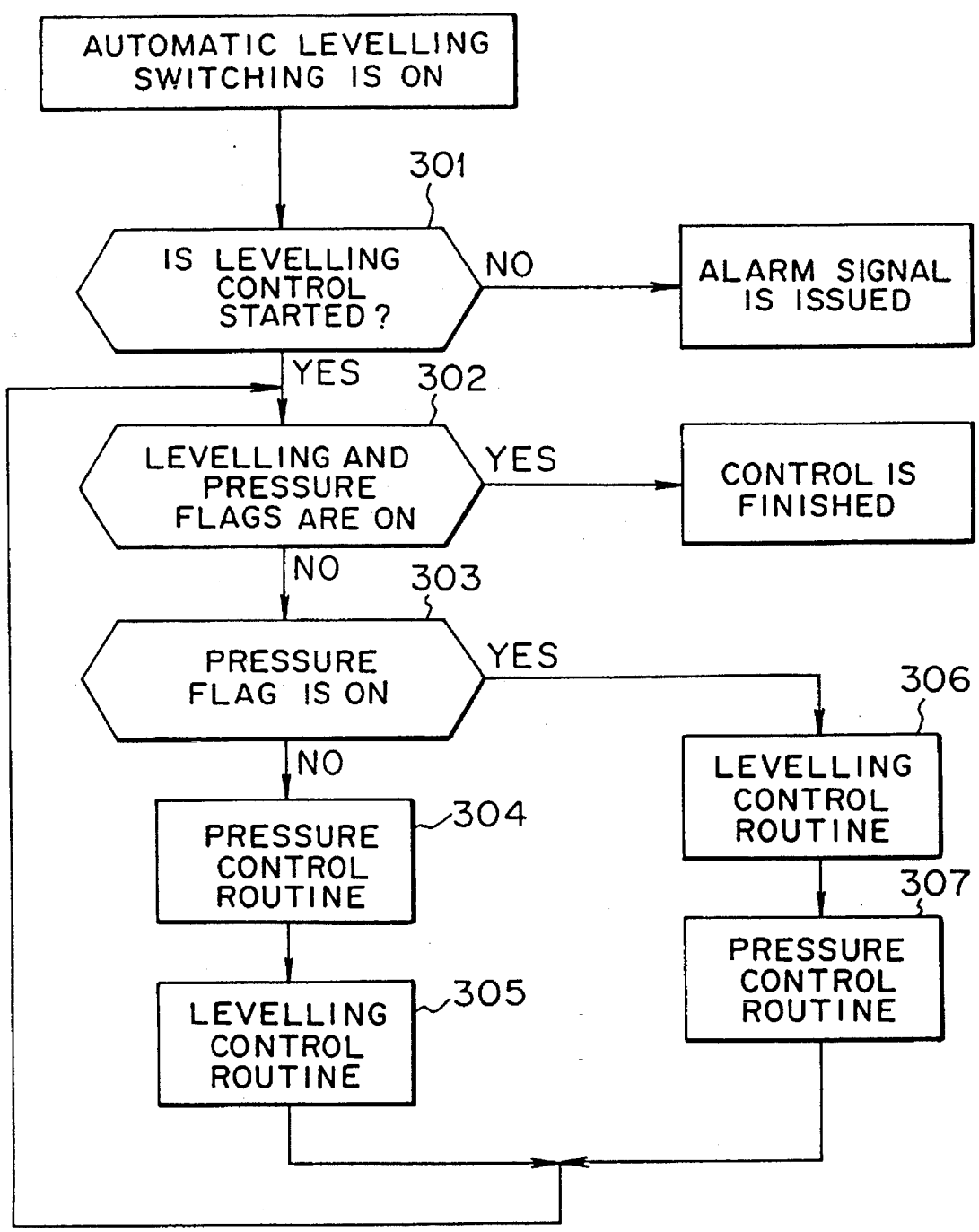

When the automatic levelling switch 121 is turned on in this state, the program goes to a step 301, as illustrated in FIG. 11, wherein the controller 120 checks whether detectors, etc. are anomalous or not. If the detectors, etc. are anomalous, the alarm means 122 issues an alarm signal. On the other hand, if they are not anomalous, the program goes to a step 302, wherein the controller 120 checks whether both levelling and pressure flags are respectively ON or not.

Figure 12:
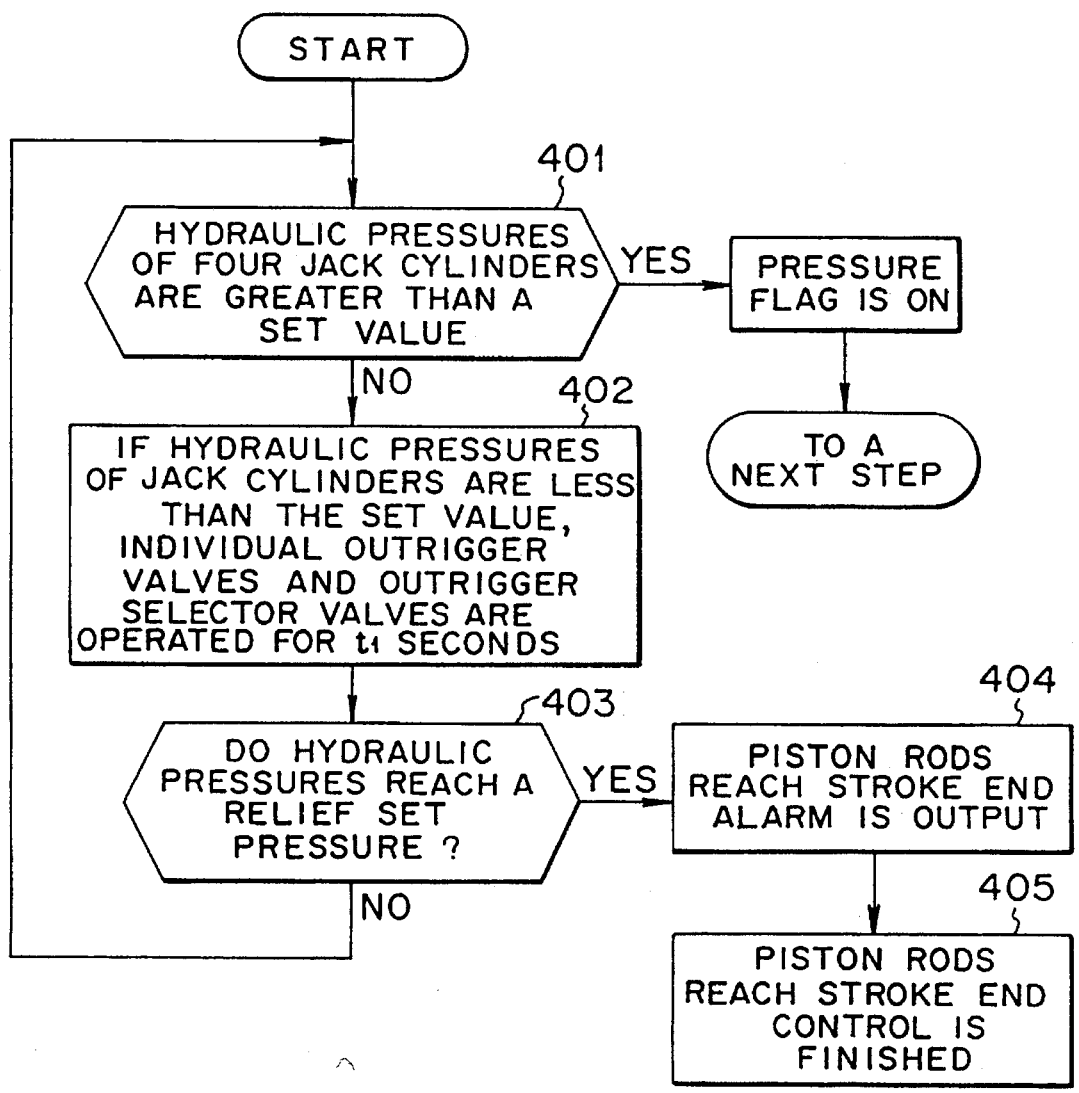

If any or both of the levelling and pressure flags are not ON, the program goes to a step 303, wherein the controller 120 checks the pressure flag. If the pressure flag is not ON, the program goes to a step 304, wherein the controller 120 executes a pressure control routine as shown in FIG. 12. Thereafter, the program goes to a step 305, wherein the controller 120 executes the levelling control routine as shown in FIG. 13.

If the pressure flag is ON in the step 303, the program goes to a step 306, wherein the controller 120 executes the levelling control routine, then the program goes to a step 307, wherein the controller 120 executes the pressure control routine, and finally it returns to the step 302, wherein the controller 120 checks whether both levelling and pressure flags are ON or not. If both levelling and pressure flags are ON, the controller 120 judges that the levelling of the vehicle body is completed and issues a control end indication to the display unit 123, so that the levelling control is finished.

The pressure control routine will be now described with reference to FIG. 12. The controller 120 judges whether hydraulic pressures of the four jack cylinders 7 reach a set value by which tires float or not in a step 401. If the hydraulic pressures do not reach the set value, the program goes to a step 402, wherein the controller 120 operates the individual outrigger valves 111 and outrigger selector valves 110 of the jack cylinders 7, hydraulic pressures of which do not reach the set value, for a period of time $t_1$ seconds so as to supply a short hydraulic pressure.

Thereafter, the program returns to the step 401, wherein the controller 120 checks whether the hydraulic pressures reach the set value. If the hydraulic pressures reach the set value, the controller 120 permits the levelling flag to be ON, and the program goes to a next step.

The controller 120 checks whether the hydraulic pressures of the jack cylinders 7 reach a relief set pressure or not in a step 403. If the hydraulic pressures of the jack cylinders 7 reach the relief set pressure, the controller 120 judges that the piston rods of the jack cylinders 7 reach stroke ends, and the program goes to steps 404 and 405, wherein an alarm signal is issued by the alarm means 122, and the control is finished.

The levelling control routine will be now described with reference to FIG. 13.

Suppose that the vehicle body 1a stops on the inclined ground. If the front to rear inclination angle $\alpha$ is greater than 0, i.e., $\alpha>0$, the vehicle body 1a is lifted at the front thereof. On the other hand, if the left to right inclination angle $\beta$ is greater than 0, i.e., $\beta>0$, the vehicle body 1a is lifted at the left thereof.

Firstly, the controller 120 checks whether both absolute values of $\alpha$ and $\beta$ are less than the set value ao or not. If both absolute value of $\alpha$ and $\beta$ are not less than the set value ao, the program goes to a step 502.

In the step 502, if the front to rear and left to right inclinations of the vehicle body 1a are expressed as the inclination angle $\alpha>0$ and the inclination angle $\beta>0$, the controller 120 judges that the vehicle body 1a is lifted at the front left thereof and operates a rear right individual outrigger valve 111 in response to the magnitude of the inclination angles $\alpha$ and $\beta$.

If both absolute values of $\alpha$ and $\beta$ are less than the set value ao in the step 501, the controller 120 permits the levelling flag to be ON, and the program goes to a next step.

If the outrigger arms 6 extend long in the automatic levelling control operation, the varied amount of the inclination angles of the vehicle body 1a is small compared with a case where the outrigger arm 6 extend short, provided that the jack cylinders 7 are operated for the same interval of time. As a result, it takes much time for positioning the vehicle body 1a to a precise levelling position.

In the control system as shown in FIG. 10, the detectors 116 for detecting extension lengths of the outrigger arms are provided, wherein operation times $t_j$ of the individual outrigger valves 111 are compensated in response to values detected by the detectors 116.

As a result, high accurate levelling control can be performed regardless of the extension lengths of the outrigger arms 6.

When the hydraulic pressures of the jack cylinders 7 are detected at the bottom and head sides thereof, an axial force of each jack cylinder 7 can be calculated based on the difference in area and pressure between the bottom side of each jack cylinder 7 and the head side thereof, whereby the controller 120 can judge the float of the tire more accurately. As a result, the time to complete the pressure control routine can be reduced.

INDUSTRIAL UTILIZATION

As mentioned above in detail, necessary hydraulic oil is supplied from the control valves to the jack cylinders of the outriggers by merely turning on the automatic levelling switch so that the vehicle body is levelled. As a result, the vehicle body can be fixed in a levelled state in a short time.

Accordingly, the working vehicle can start its operation quickly, which leads to the improvement of the working efficiency. Further, since the prior art control valves can be used as they are, the vehicle body levelling device can be worked without changing the prior art device considerably, which makes it economical.

Since the vehicle body can be levelled as low as possible in its position, the center of gravity is lowered, which improves its stability during the operation thereof. Further, the hydraulic oil necessary for levelling the vehicle body is surely supplied to the jack cylinders, or the hydraulic oil is supplied to the jack cylinders so as to generate necessary axial force of the jack cylinders, so that the vehicle body is prevented from being stabilized due to the shortage of hydraulic pressure after the vehicle body is levelled or the shortage of the axial force, or the vehicle body is prevented from being overturned.

Still further, since the extension lengths of the outrigger arms are detected so as to compensate the operation times of the individual outrigger valves, the vehicle body can be always levelled in a short period of time even if the extension lengths of the outrigger arms are differentiated from one another on the ground where the working vehicle is located.

I claim:

1. In a vehicle body levelling device for a working vehicle having outriggers provided at the front and rear of a self-propelled lower running body, said outriggers comprising outrigger arms which can be extended and contracted in the left and right directions thereof for stabilizing said vehicle body while in service, and jack cylinders having piston rods and provided at distal ends of said outrigger arms for vertically supporting said vehicle body, said vehicle body levelling device comprises:

- a front to rear inclination detector for detecting an inclination of said vehicle body in the front to rear directions thereof;
- a left to right inclination detector for detecting an inclination of said vehicle body in the left to right directions thereof;
- outrigger length detectors for detecting lengths of said outrigger arms; and
- a controller for calculating extension/contraction amounts of said piston rods of said jack cylinders and controlling control valves provided on said jack cylinders in accordance with results of calculation.

2. In a vehicle body levelling device for a working vehicle having outriggers provided at the front and rear of a self-propelled lower running body, said outriggers comprising outrigger arms which can be extended and contracted in the left and right directions thereof for stabilizing said vehicle body while in service, and jack cylinders having piston rods and provided at distal ends of said outrigger arms for vertically supporting said vehicle body, said vehicle body levelling device comprises:

- a two-axis inclination detector for detecting inclinations of said vehicle body in the front to rear and left to fight directions thereof;
- hydraulic pressure detectors provided on said jack cylinders for detecting hydraulic pressures in said jack cylinders; and
- a controller for calculating extension/contraction amounts of said piston rods of said jack cylinders in accordance with inclinations of said vehicle body detected by said two axis inclination detector and for controlling individual outrigger valves provided on said jack cylinders such that hydraulic pressures of said jack cylinders become a predetermined value.

3. A vehicle body levelling device according to claim 2, further comprising outrigger extension length detectors for detecting extension lengths of said outrigger arms, wherein operating times of said individual outrigger valves are compensated in response to extension lengths detected by said extension length detectors.

* * * * *